B. Smith,
Harvester Rake.
No. 39249.  Patented July 14, 1863.
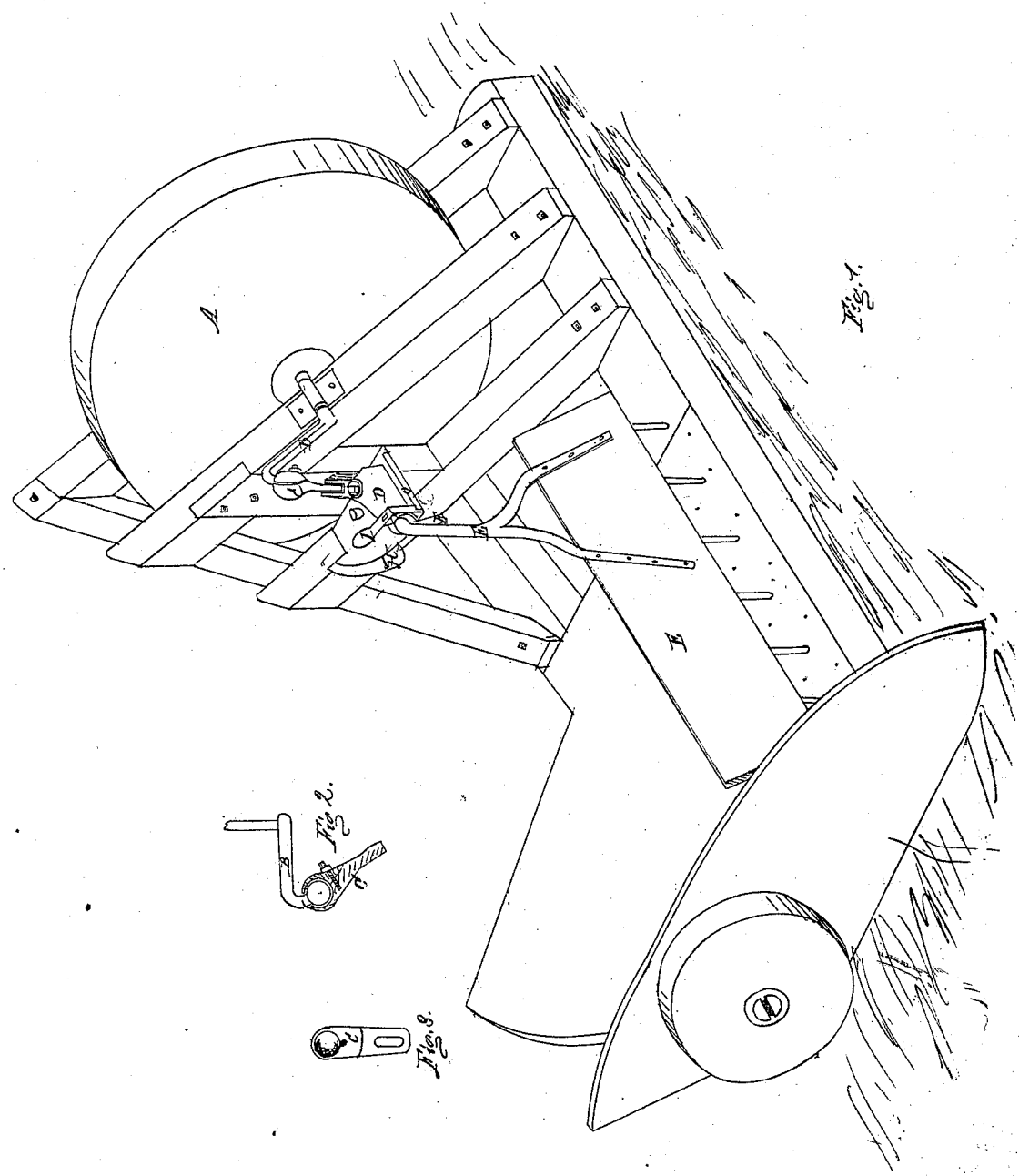

UNITED STATES PATENT OFFICE.

BENJAMIN SMITH, OF BATAVIA, ILLINOIS.

IMPROVEMENT IN RAKING ATTACHMENTS FOR HARVESTERS.

Specification forming part of Letters Patent No. 39,249, dated July 14, 1863.

*To all whom it may concern:*

Be it known that I, BENJAMIN SMITH, of the town of Batavia and county of Kane, in the State of Illinois, have invented a new and useful improvement in the manner of connecting and moving an automatic rake with the driving-power of a reaping-machine; and I do hereby declare that the following is a full, clear, and exact description of the construction and operation of the same, reference being had to the annexed drawings, making a part of this specification, in which—

Figure 1 is a perspective view of a part of a reaping-machine, showing the manner of attaching the rake to the driving wheel or power of said machine.

Letter A is a driving-wheel with a crank, B, attached to the end of the shaft. Said crank has a crooked neck with a ball-journal, as seen in Fig. 2, on one end, which is connected with one end of a pitman, C, with a socket to fit and receive the ball, while the other end is attached to the rake-holder D by means of a socket-joint, the pitman having a slot in the end, Fig. 3, or joint for a bolt to pass, as seen in Figs. 3 and 2, through, holding them firmly together and admitting the pitman being extended and contracted as the turning of the crank requires.

The rake-head E is made to roll up as the grain comes off the platform by means of a finger-like piece, F, on one side of the rake, which comes in contact with a projection on the stand H. When rolled up it is held by a catch, I, that drops into a notch until it returns for another bundle, when, as the lower end of the catch presses the rim of the stand O, it raises the catch and the rake falls.

Having thus fully described my invention, what I claim, and desire to secure by Letters Patent, is—

In combination with a rake that is operated by a crooked-necked crank and a flexible or ball-and-socket connection, and rolled up upon a guide-piece, F, a self connecting and disconnecting catch, I, that holds the rake up at certain intervals and allows it to drop upon the platform when about to clear it of the cut grain, substantially as described and represented.

In witness that I claim the above I have hereunto set my hand in the presence of two subscribing witnesses.

BENJ. SMITH.

Witnesses:
L. K. OSBORN,
O. L. WHEELOCK.